US011922868B2

(12) United States Patent
Han

(10) Patent No.: US 11,922,868 B2
(45) Date of Patent: Mar. 5, 2024

(54) PIXEL DRIVING CIRCUIT AND DISPLAY PANEL

(71) Applicant: Shenzhen China Star Optoelectronics Semiconductor Display Technology Co., Ltd., Guangdong (CN)

(72) Inventor: Zhibin Han, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 191 days.

(21) Appl. No.: 17/424,196

(22) PCT Filed: May 31, 2021

(86) PCT No.: PCT/CN2021/097134
§ 371 (c)(1),
(2) Date: Jul. 20, 2021

(87) PCT Pub. No.: WO2022/147952
PCT Pub. Date: Jul. 14, 2022

(65) Prior Publication Data

US 2023/0162669 A1 May 25, 2023

(30) Foreign Application Priority Data

Jan. 7, 2021 (CN) ......................... 202110018814.8

(51) Int. Cl.
*G09G 3/3225* (2016.01)

(52) U.S. Cl.
CPC ... *G09G 3/3225* (2013.01); *G09G 2300/0426* (2013.01); *G09G 2300/0842* (2013.01); *G09G 2310/0264* (2013.01); *G09G 2310/08* (2013.01); *G09G 2330/028* (2013.01)

(58) Field of Classification Search
CPC ... G09G 2300/0426; G09G 2300/0842; G09G 2310/0264; G09G 2310/07; G09G 2330/028; G09G 3/3225–325
See application file for complete search history.

(56) References Cited

U.S. PATENT DOCUMENTS

2009/0225011 A1* 9/2009 Choi .................... G09G 3/3233 345/76
2009/0315815 A1* 12/2009 Woo ..................... G09G 3/3233 345/82
2011/0279484 A1 11/2011 Han et al.
2017/0039944 A1* 2/2017 Ma ....................... G09G 3/3258
(Continued)

FOREIGN PATENT DOCUMENTS

CN 103700345 4/2014
CN 104167177 11/2014
(Continued)

*Primary Examiner* — Hang Lin

(57) ABSTRACT

This application provides a pixel driving circuit and a display panel. The pixel driving circuit includes N pixel driving units connected in cascade. Any one of the pixel driving units includes a light-emitting module, a switch module connected to a first control signal of an nth stage, a detection module connected to a second control signal of the nth stage, and a reset module connected to a reset signal of the nth stage; and the reset signal of the nth stage is connected to an output terminal that outputs a control signal of an mth stage.

16 Claims, 10 Drawing Sheets

(56) References Cited

U.S. PATENT DOCUMENTS

| | | | | |
|---|---|---|---|---|
| 2017/0243537 | A1* | 8/2017 | Wu | G09G 3/3233 |
| 2018/0190197 | A1* | 7/2018 | Chang | G09G 3/3233 |
| 2018/0315374 | A1* | 11/2018 | Zhang | G09G 3/3208 |
| 2018/0357963 | A1* | 12/2018 | Gai | G09G 3/3233 |
| 2020/0051496 | A1* | 2/2020 | Kang | G09G 3/3275 |
| 2020/0243005 | A1* | 7/2020 | Li | G09G 3/3225 |
| 2021/0210005 | A1* | 7/2021 | Zhou | G09G 3/325 |

FOREIGN PATENT DOCUMENTS

| | | |
|---|---|---|
| CN | 104933993 | 9/2015 |
| CN | 106325603 | 1/2017 |
| CN | 107068065 | 8/2017 |
| CN | 109166529 | 1/2019 |
| CN | 109166530 | 1/2019 |
| CN | 110517641 | 11/2019 |
| CN | 110992878 | 4/2020 |
| CN | 112599100 | 4/2021 |
| KR | 10-2018-0025522 | 3/2018 |

* cited by examiner

PIXEL DRIVING CIRCUIT AND DISPLAY PANEL

RELATED APPLICATIONS

This application is a National Phase of PCT Patent Application No. PCT/CN2021/097134 having International filing date of May 31, 2021, which claims the benefit of priority of Chinese Patent Application No. 202110018814.8 filed on Jan. 7, 2021. The contents of the above applications are all incorporated by reference as if fully set forth herein in their entirety.

FIELD AND BACKGROUND OF THE INVENTION

The present disclosure relates to the field of display technology, in particular to a pixel driving circuit and a display panel.

In an existing large-size active-matrix organic light-emitting diode (AMOLED) display panel, due to a large surface resistance of a cathode layer, voltage drops generated at different positions of the display panel are inconsistent, which decrease display uniformity of the display panel. Secondly, due to increase in resolution, a reset time of an anode terminal of each pixel driving unit is reduced, so that an anode terminal of an organic light-emitting diode cannot be reset to a working potential within a predetermined time, which further deteriorates the display uniformity of the display panel.

Currently, there is an urgent need for a pixel driving circuit to solve the above technical problems.

SUMMARY OF THE INVENTION

The present disclosure provides a pixel driving circuit and a display panel, in order to solve a technical problem of poor display uniformity of the existing display panel.

The present disclosure provides a pixel driving circuit, wherein the pixel driving circuit comprises N pixel driving units cascaded, and a pixel driving unit of an nth stage is any one of the N pixel driving units, and the pixel driving unit of the nth stage comprises:

a light-emitting module comprising a light-emitting device for emitting light;

a switch module connected to the light-emitting module, wherein the switch module is connected to a first control signal of the nth stage and a data signal, and the switch module is configured to transmit the data signal to the light-emitting module under control of the first control signal of the nth stage;

a detection module connected to the light-emitting module, wherein the detection module is connected to a second control signal of the nth stage, and the detection module is configured to detect a monitoring voltage of a first node in the light-emitting module and generate a compensation voltage of the light-emitting module according to a preset voltage; and a reset module connected to the light-emitting module, wherein the reset module is connected to a reset signal of the nth stage, and the reset signal of the nth stage is connected to an output terminal that outputs a control signal of an mth stage, and the reset module is configured to reset a potential of the first node to a threshold potential, wherein N, n, and m are positive integers, n and m are both less than or equal to N, and n is greater than m.

In the pixel driving circuit of the present disclosure, at least two of the N pixel driving units are electrically connected to a same data signal line.

In the pixel driving circuit of the present disclosure, the switch module comprises a storage capacitor and a first thin film transistor;

wherein a first terminal of the storage capacitor is electrically connected to a second node, and a second terminal of the storage capacitor is electrically connected to the first node; and wherein a gate of the first thin film transistor is electrically connected to the first control signal of the nth stage, a source of the first thin film transistor is electrically connected to the data signal, and a drain of the first thin film transistor is electrically connected to the second node.

In the pixel driving circuit of the present disclosure, the light-emitting module comprises a second thin film transistor and the light-emitting device;

wherein a gate of the second thin film transistor is electrically connected to the second node, a source of the second thin film transistor is electrically connected to a constant voltage high level source, and a drain of the second thin film transistor is electrically connected to the first node; and wherein an anode terminal of the light-emitting device is electrically connected to the first node, and a cathode terminal of the light-emitting device is electrically connected to a first constant voltage low level source.

In the pixel driving circuit of the present disclosure, the detection module comprises a third thin film transistor and a voltage detection module; and wherein a gate of the third thin film transistor is electrically connected to the second control signal of the nth stage, a source of the third thin film transistor is electrically connected to the voltage detection module, and a drain of the third thin film transistor is electrically connected to the first node, and the voltage detection module is configured to detect the monitoring voltage of the light-emitting module, and generate the compensation voltage of the light-emitting module according to comparison between the monitoring voltage and a preset voltage.

In the pixel driving circuit of the present disclosure, the reset module comprises a fourth thin film transistor, a gate of the fourth thin film transistor is electrically connected to the reset signal of the mth stage, a source of the fourth thin film transistor is electrically connected to the anode terminal of the light-emitting device, and the drain of the fourth thin film transistor is electrically connected to a second constant voltage low level source, and the reset module is configured to reset the potential of the anode terminal of the light-emitting device to the threshold potential.

In the pixel driving circuit of the present disclosure, the reset signal of the nth stage is connected to a first control signal output terminal that outputs the first control signal of an (n−i)th stage, and the first control signal of the (n−i)th stage is configured to transmit the data signal to the light-emitting module and reset the potential of the anode terminal of the light-emitting device to the threshold potential; or the reset signal of the nth stage is connected to a second control signal output terminal that outputs the second control signal of an (n−j)th stage, and the second control signal of the (n−j)th stage is configured to detect the monitoring voltage of the light-emitting module and reset the potential of the anode terminal of the light-emitting device to the threshold potential; and wherein i and j are positive integers.

In the pixel driving circuit of the present disclosure, the reset signal of the nth stage is connected to a first control signal output terminal that outputs the first control signal of an (n−i)th stage and a second control signal output terminal of the second control signal of an (n−j)th stage, i and j are positive integers; and wherein the reset module further comprises a control switch electrically connected to the gate of the fourth thin film transistor, and the control switch is configured to transmit the first control signal of the (n−i)th stage or the second control signal of the (n−j)th stage to the gate of the fourth thin film transistor.

In the pixel driving circuit of the present disclosure, the reset signal of the nth stage and a first control signal output terminal for outputting the first control signal of an (n−i)th stage are connected to a second control signal output terminal for outputting the second control signal of an (n−j)th stage, and i and j are positive integers.

In the pixel driving circuit of the present disclosure, the reset module further comprises a fifth thin film transistor, a source of the fifth thin film transistor is electrically connected to the anode terminal of the light-emitting device, and a drain of the fifth thin film transistor is electrically connected to a third constant voltage low level source; and wherein a gate of the fifth thin film transistor is electrically connected to a second control signal output terminal that outputs the second control signal of an (n−j)th stage, and the gate of the fourth thin film transistor is electrically connected to a first control signal output terminal that outputs the first control signal an (n−i)th stage.

The present disclosure further provides a display panel, wherein the display panel comprises a pixel driving circuit comprising N pixel driving units cascaded, and a pixel driving unit of an nth stage is any one of the N pixel driving units, and the pixel driving unit of the nth stage comprises:

- a light-emitting module comprising a light-emitting device for emitting light;
- a switch module connected to the light-emitting module, wherein the switch module is connected to a first control signal of the nth stage and a data signal, and the switch module is configured to transmit the data signal to the light-emitting module under control of the first control signal of the nth stage;
- a detection module connected to the light-emitting module, wherein the detection module is connected to a second control signal of the nth stage, and the detection module is configured to detect a monitoring voltage of a first node in the light-emitting module and generate a compensation voltage of the light-emitting module according to a preset voltage; and
- a reset module connected to the light-emitting module, wherein the reset module is connected to a reset signal of the nth stage, and the reset signal of the nth stage is connected to an output terminal that outputs a control signal of an mth stage, and the reset module is configured to reset a potential of the first node to a threshold potential, wherein N, n, and m are positive integers, n and m are both less than or equal to N, and n is greater than m.

In the display panel of the present disclosure, at least two of the N pixel driving units are electrically connected to a same data signal line.

In the display panel of the present disclosure, the switch module comprises a storage capacitor and a first thin film transistor;

wherein a first terminal of the storage capacitor is electrically connected to a second node, and a second terminal of the storage capacitor is electrically connected to the first node; and wherein a gate of the first thin film transistor is electrically connected to the first control signal of the nth stage, a source of the first thin film transistor is electrically connected to the data signal, and a drain of the first thin film transistor is electrically connected to the second node.

In the display panel of the present disclosure, the light-emitting module comprises a second thin film transistor and the light-emitting device;

wherein a gate of the second thin film transistor is electrically connected to the second node, a source of the second thin film transistor is electrically connected to a constant voltage high level source, and a drain of the second thin film transistor is electrically connected to the first node; and wherein an anode terminal of the light-emitting device is electrically connected to the first node, and a cathode terminal of the light-emitting device is electrically connected to a first constant voltage low level source.

In the display panel of the present disclosure, the detection module comprises a third thin film transistor and a voltage detection module; and wherein a gate of the third thin film transistor is electrically connected to the second control signal of the nth stage, a source of the third thin film transistor is electrically connected to the voltage detection module, and a drain of the third thin film transistor is electrically connected to the first node, and the voltage detection module is configured to detect the monitoring voltage of the light-emitting module, and generate the compensation voltage of the light-emitting module according to comparison between the monitoring voltage and a preset voltage.

In the display panel of the present disclosure, the reset module comprises a fourth thin film transistor, a gate of the fourth thin film transistor is electrically connected to the reset signal of the mth stage, a source of the fourth thin film transistor is electrically connected to the anode terminal of the light-emitting device, and the drain of the fourth thin film transistor is electrically connected to a second constant voltage low level source, and the reset module is configured to reset the potential of the anode terminal of the light-emitting device to the threshold potential.

In the display panel of the present disclosure, the reset signal of the nth stage is connected to a first control signal output terminal that outputs the first control signal of an (n−i)th stage, and the first control signal of the (n−i)th stage is configured to transmit the data signal to the light-emitting module and reset the potential of the anode terminal of the light-emitting device to the threshold potential; or the reset signal of the nth stage is connected to a second control signal output terminal that outputs the second control signal of an (n−j)th stage, and the second control signal of the (n−j)th stage is configured to detect the monitoring voltage of the light-emitting module and reset the potential of the anode terminal of the light-emitting device to the threshold potential; and wherein i and j are positive integers.

In the display panel of the present disclosure, the reset signal of the nth stage is connected to a first control signal output terminal that outputs the first control signal of an (n−i)th stage and a second control signal output terminal of the second control signal of an (n−j)th stage, i and j are positive integers; and wherein the reset module further comprises a control switch electrically connected to the gate of the fourth thin film transistor, and the control switch is configured to transmit the first control signal of the (n−i)th stage or the second control signal of the (n−j)th stage to the gate of the fourth thin film transistor.

In the display panel of the present disclosure, the reset signal of the nth stage and a first control signal output terminal for outputting the first control signal of an (n−i)th stage are connected to a second control signal output terminal for outputting the second control signal of an (n−j)th stage, and i and j are positive integers.

In the display panel of the present disclosure, the reset module further comprises a fifth thin film transistor, a source of the fifth thin film transistor is electrically connected to the anode terminal of the light-emitting device, and a drain of the fifth thin film transistor is electrically connected to a third constant voltage low level source; and wherein a gate of the fifth thin film transistor is electrically connected to a second control signal output terminal that outputs the second control signal of an (n−j)th stage, and the gate of the fourth thin film transistor is electrically connected to a first control signal output terminal that outputs the first control signal an (n−i)th stage.

The present disclosure proposes a pixel driving circuit and a display panel. The pixel driving circuit comprises N pixel driving units connected in cascade. Any one of the pixel driving units comprises the light-emitting module, the switch module connected to the first control signal of the nth stage, the detection module connected to the second control signal of the nth stage, and the reset module connected to the reset signal of the nth stage; the reset signal of the nth stage is connected to the output terminal that outputs the control signal of the mth stage, so that when the light-emitting module of the mth stage is working, the reset module of the nth stage is operated in advance through the control signal of the current stage to reset the potential of the anode terminal of the light-emitting device in the light-emitting module to the threshold potential, which increases a reset time for the reset module 104 to reset the potential of the anode terminal and causes the potential of the anode terminal of the light-emitting device to be pulled up to the threshold potential, therefore improving display uniformity of the display panel.

DESCRIPTION OF SPECIFIC EMBODIMENTS OF THE INVENTION

Figure 1:
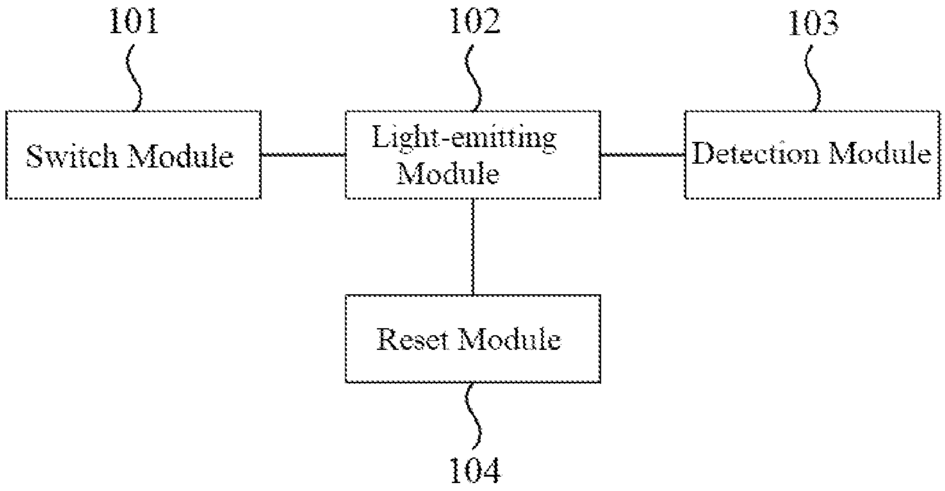
FIG. 1 is a schematic structural diagram of a pixel driving circuit of the present disclosure.

In order to make the purpose, technical solutions, and effects of the present disclosure more clear, the following further describes the present disclosure in detail with reference to the accompanying drawings and examples. It should be understood that the specific embodiments described here are only used to explain the present disclosure, and are not used to limit the present disclosure.

In an existing large-size display panel, due to increase in resolution, a reset time of an anode terminal of each pixel driving unit is reduced, so that an anode terminal of an organic light-emitting diode cannot be reset to a working potential within a predetermined time, which further deteriorates the display uniformity of the display panel. According to the above technical problem, the present disclosure provides the following technical solutions:

Referring to FIGS. 1 to 6, the present disclosure provides a pixel driving circuit, and the pixel driving circuit comprises N pixel driving units cascaded. A pixel driving unit of an nth stage is any one of the N pixel driving units, and the pixel driving unit of the nth stage comprises:

A light-emitting module 102 comprising a light-emitting device for emitting light;

A switch module 101 connected to the light-emitting module 102, wherein the switch module 101 is connected to a first control signal of the nth stage and a data signal, the switch module 101 is configured to transmit the data signal to the light-emitting module 102 under control of the first control signal of the nth stage;

A detection module 103 connected to the light-emitting module 102, wherein the detection module 103 is connected to a second control signal of the nth stage, and the detection module 103 is configured to detect a monitoring voltage of a first node S in the light-emitting module 102 and generate a compensation voltage Vc of the light-emitting module 102 according to a preset voltage; and A reset module 104 connected to the light-emitting module 102, wherein the reset module 104 is connected to a reset signal of the nth stage, and the reset signal of the nth stage is connected to an output terminal that outputs a control signal of an mth stage, and the reset module 104 is configured to reset a potential of the first node S to a threshold potential, wherein N, n, and m are positive integers, n and m are both less than or equal to N, and n is greater than m.

The present disclosure provides a pixel driving circuit and a display panel. The pixel driving circuit comprises N pixel driving units connected in cascade. Any one of the pixel driving units comprises the light-emitting module 102, the switch module 101 connected to the first control signal of the nth stage, the detection module 103 connected to the second control signal of the nth stage, and the reset module 104 connected to the reset signal of the nth stage; the reset signal of the nth stage is connected to the output terminal that outputs the control signal of the mth stage, so that when the light-emitting module 102 of the mth stage is operated, the reset module 104 of the n-th stage is operated in advance through the control signal of the mth stage, so as to reset a potential of an anode terminal of the light-emitting device in the light-emitting module 102 to the threshold potential, which increases a reset time for the reset module 104 to reset the potential of the anode terminal and causes the potential of the anode terminal of the light-emitting device to be pulled up to the threshold potential, therefore improving display uniformity of the display panel.

The technical solution of the present disclosure will now be described in conjunction with specific embodiments.

The pixel circuit disclosed in the present disclosure may be a conventional two thin film transistors and a storage capacitor (2T1C), three thin film transistors and a storage capacitor (3T1C), five thin film transistors and a storage capacitor (5T1C), or seven thin film transistors and a storage capacitor (7T1C), etc. The following takes a conventional 2T1C as an example for description.

In the pixel driving circuit of the present disclosure, at least two of the N pixel driving units may be electrically connected to a same data signal line. That is, the technical solution disclosed in the present disclosure may be pixel driving units on the same data signal line, or may be pixel driving units on different data signal lines. In order to describe the above technical solution, in the present disclosure, the pixel driving units in FIGS. 1 to 6 are connected to a same data line Data, and the pixel driving units in FIG. 7 are connected to different data lines Data.

Please refer to FIGS. 1 to 6, in the pixel driving circuit of the present disclosure, the switch module 101 may comprise a storage capacitor and a first thin film transistor T1. A first terminal of the storage capacitor is electrically connected to a second node G, and a second terminal of the storage capacitor is electrically connected to the first node S. A gate of the first thin film transistor T1 is electrically connected to the first control signal of the nth stage, a source of the first thin film transistor T1 is electrically connected to the data signal, and a drain of the first thin film transistor T1 is electrically connected to the second node G.

Please refer to FIGS. 1 to 6, in the pixel driving circuit of the present disclosure, the light-emitting module 102 comprises a second thin film transistor T2 and the light-emitting device. A gate of the second thin film transistor T2 is electrically connected to the second node G, a source of the second thin film transistor T2 is electrically connected to a constant voltage high level source VDD, and a drain of the second thin film transistor T2 is electrically connected to the first node S. The anode terminal of the light-emitting device is electrically connected to the first node S, and a cathode terminal of the light-emitting device is electrically connected to a first constant voltage low level source VSS.

In this embodiment, the first constant voltage low level source VSS may be a ground terminal.

Please refer to FIGS. 1 to 6, in the pixel driving circuit of the present disclosure, the detection module 103 comprises a third thin film transistor T3 and a voltage detection module. A gate of the third thin film transistor T3 is electrically connected to the second control signal of the nth stage, a source of the third thin film transistor T3 is electrically connected to the voltage detection module, and a drain of the third thin film transistor T3 is electrically connected to the first node S, and the voltage detection module is configured to detect the monitoring voltage of the light-emitting module 102, and generate the compensation voltage Vc of the light-emitting module 102 according to comparison between the monitoring voltage and the preset voltage.

Please refer to FIGS. 1 to 6, in the pixel driving circuit of the present disclosure, the reset module 104 comprises a fourth thin film transistor T4. A gate of the fourth thin film transistor T4 is electrically connected to the reset signal of the mth stage, a source of the fourth thin film transistor T4 is electrically connected to the anode terminal of the light-emitting device, a drain of the fourth thin film transistor T4 is electrically connected to a second constant voltage low level source, and the reset module 104 is configured to reset the potential of the anode terminal of the light-emitting device to the threshold potential.

In this embodiment, the second constant voltage low level source may be a ground terminal.

In this embodiment, the first control signal and the second control signal may be scanning signals or other control signals, which are not specifically limited in the present disclosure.

Since the conventional 2T1C structure adds a detection module 103 and a reset module 104, each of which has a thin film transistor, the structure becomes a 4T1C structure at this time.

In the pixel driving circuit of the present disclosure, the reset signal of the nth stage is connected to a first control signal output terminal that outputs the first control signal of an (n−i)th stage, and the first control signal of the (n−i)th stage is configured to transmit the data signal to the light-emitting module 102 and reset the potential of the anode terminal of the light-emitting device to the threshold potential. Alternatively, the reset signal of the nth stage is connected to a second control signal output terminal that outputs the second control signal of an (n−j)th stage, and the second control signal of the (n−j)th stage is configured to detect the monitoring voltage of the light-emitting module 102 and reset the potential of the anode terminal of the light-emitting device to the threshold potential.

In this embodiment, i and j are positive integers, i and j may be equal or unequal. For example, when the two are not equal, i is 1 and j is 2, it is equivalent to the reset signal of the nth stage coming from the first control signal of an (n−1)th stage or the second control signal of an (n−2)th stage. The specific values of i and j are not limited in detail in the present disclosure. For the convenience of description, the following embodiments take i and j as 1 for description.

Figure 2:
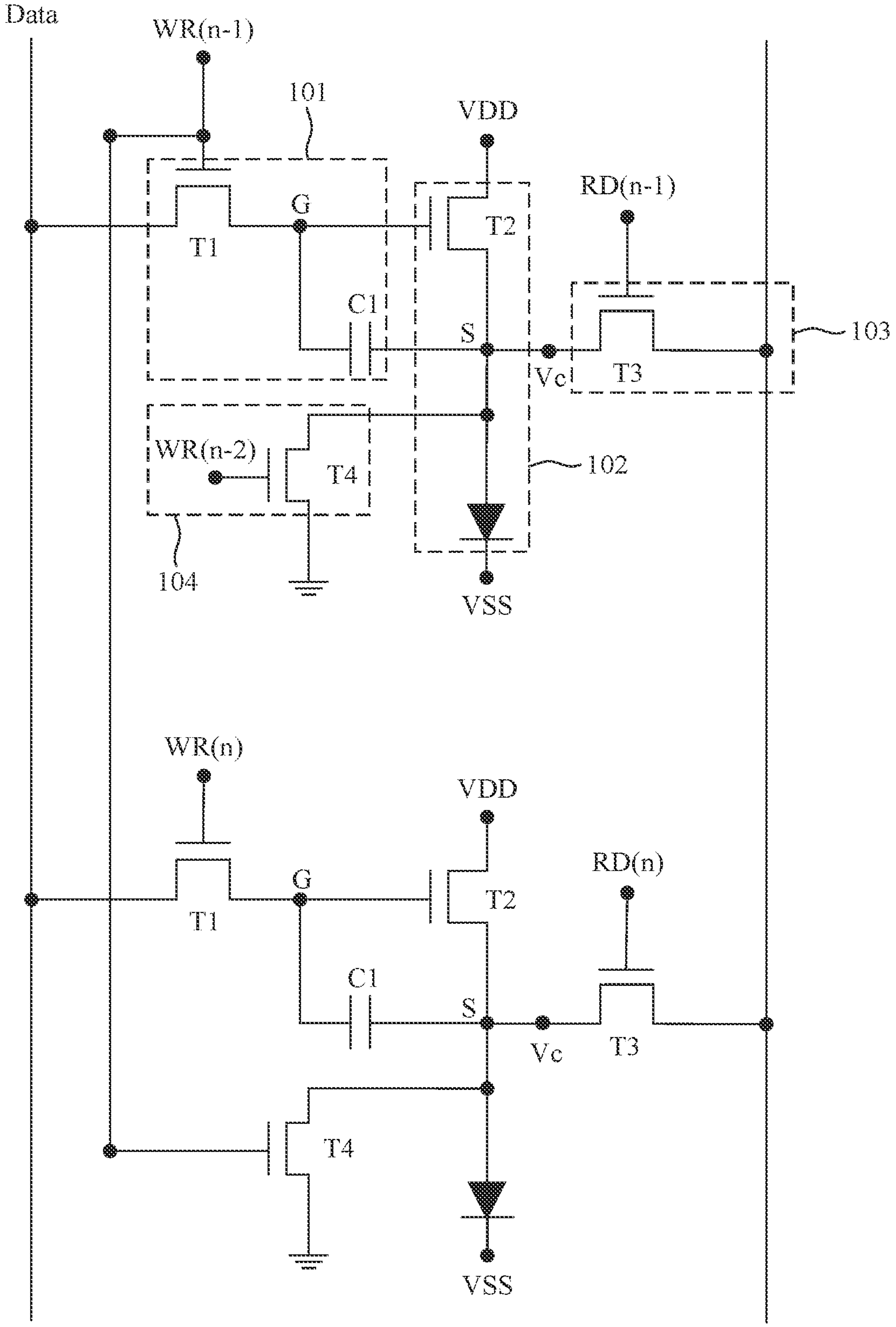
FIG. 2 is a first structural diagram of a pixel driving unit in the pixel driving circuit of the present disclosure.

Referring to FIG. 2, a first control signal WRn−1 of the (n−1)th stage is a write signal, which is connected to the gate of the first thin film transistor T1 in the switch module 101 to control the switching of the first thin film transistor T1. The second control signal RDn−1 of the (n−1)th stage is a read signal, which is connected to the gate of the third thin film transistor T3 in the detection module 103 to control the switching of the third thin film transistor T3. A reset signal of the (n−1)th stage may come from a first control signal WRn−2 of an (n−2)th stage. Similarly, the first control signal WRn−1 of the (n−1)th stage and the gate of the fourth thin film transistor T4 in the reset module 104 are connected to control the switching of the fourth thin film transistor T4.

In this embodiment, when the first control signal WRn−1 of the (n−1)th stage turns on the first thin film transistor T1 of the current stage, it also turns on the fourth thin film transistor T4 in the reset module 104 of the nth stage at the same time. That is, when the pixel driving unit of the current stage is operated, the reset module 104 of the next stage starts to work, so that the anode terminal of the light-emitting device of the next stage is connected to the ground terminal in the reset module 104, which increases the reset time of the anode terminal of the light-emitting device.

In the pixel driving circuit of the present disclosure, the reset signal of the nth stage is connected to a second control signal output terminal that outputs the second control signal of the (n−j)th stage, and the second control signal of the (n−j)th stage is configured to detect the monitoring voltage of the light-emitting module 102 and reset the potential of the anode terminal of the light-emitting device to the threshold potential.

Figure 3:
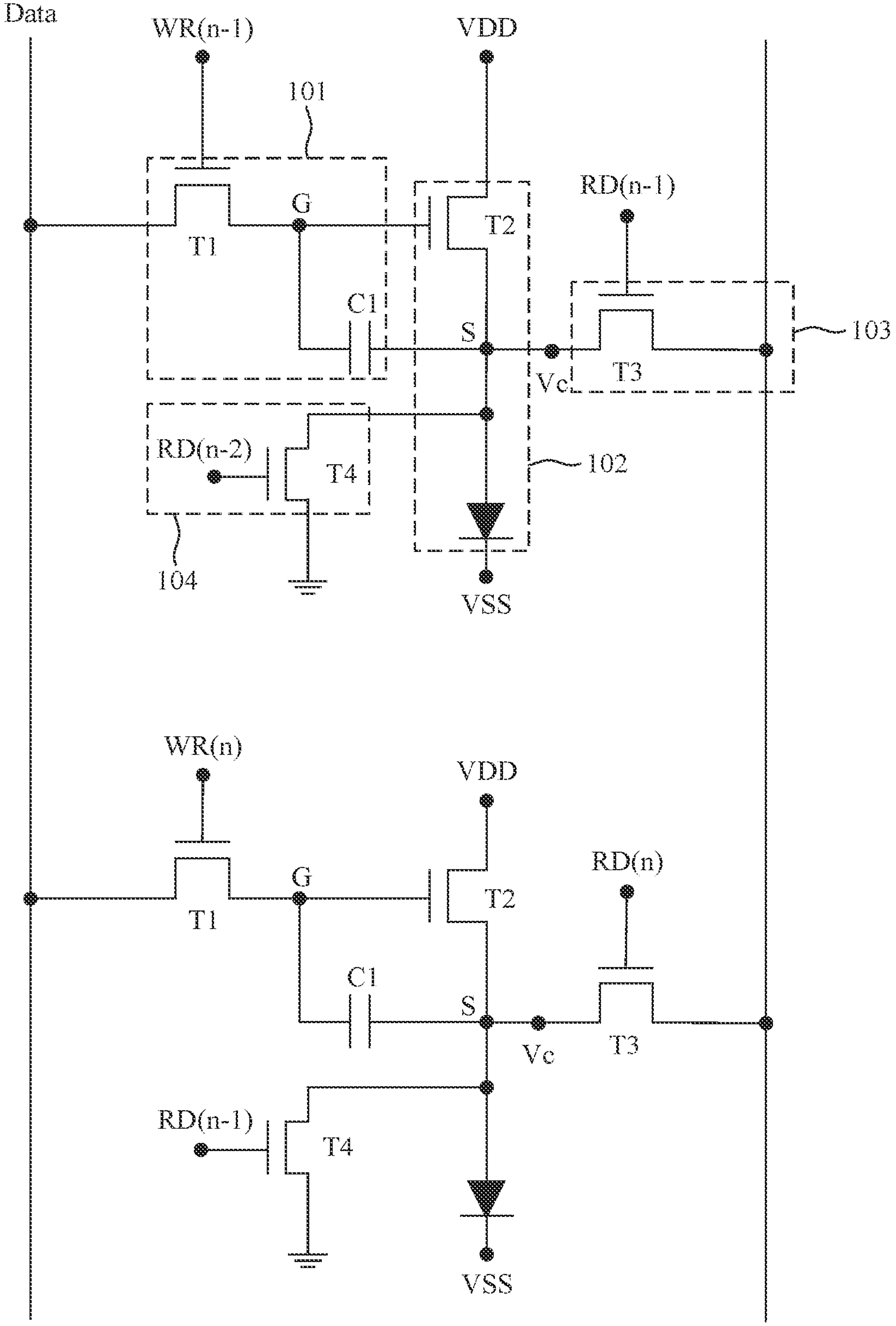
FIG. 3 is a second structural diagram of the pixel driving unit in the pixel driving circuit of the present disclosure.

Please refer to FIG. 3, the first control signal WRn−1 of the (n−1)th stage is the write signal, which is connected to the gate of the first thin film transistor T1 in the switch module 101 to control the switching of the first thin film transistor T1. The second control signal RDn−1 of the (n−1)th stage is the read signal, which is connected to the gate of the third thin film transistor T3 in the detection module 103 to control the switching of the third thin film transistor T3. The reset signal of the (n−1)th stage may come from the second control signal RDn−2 of the (n−2)th stage. Similarly, the second control signal RDn−1 of the (n−1)th stage is connected to the gate of the fourth thin film transistor T4 in the reset module 104 of the nth stage to control the switching of the fourth thin film transistor T4.

In this embodiment, when the second control signal RDn−1 of the (n−1)th stage turns on the third thin film transistor T3 of the current stage, it also turns on the fourth thin film transistor T4 in the reset module 104 of the nth stage at the same time. That is, when the pixel driving unit of the current stage is working, the reset module 104 of the next stage starts to work, so that the anode terminal of the light-emitting device of the next stage is connected to the ground terminal in the reset module 104, which increases the reset time of the anode terminal of the light-emitting device.

In the pixel driving circuit of the present disclosure, the reset signal of the nth stage is connected to the first control signal output terminal that outputs the first control signal of the (n−i)th stage and the second control signal output terminal of the second control signal of the (n−j)th stage. The first control signal of the (n−i)th stage is configured to input the data signal into the light-emitting module 102 and reset the potential of the anode terminal of the light-emitting device to the threshold potential. The second control signal of the (n−j)th stage is configured to detect the monitoring voltage of the light-emitting module 102 and reset the potential of the anode terminal of the light-emitting device to the threshold potential.

In this embodiment, the reset module 104 further comprises a control switch 105 electrically connected to the gate of the fourth thin film transistor T4, and the control switch 105 is configured to input the first control signal of the (n−i)th stage or the second control signal of the (n−j)th stage to the gate of the fourth thin film transistor T4.

Figure 4:
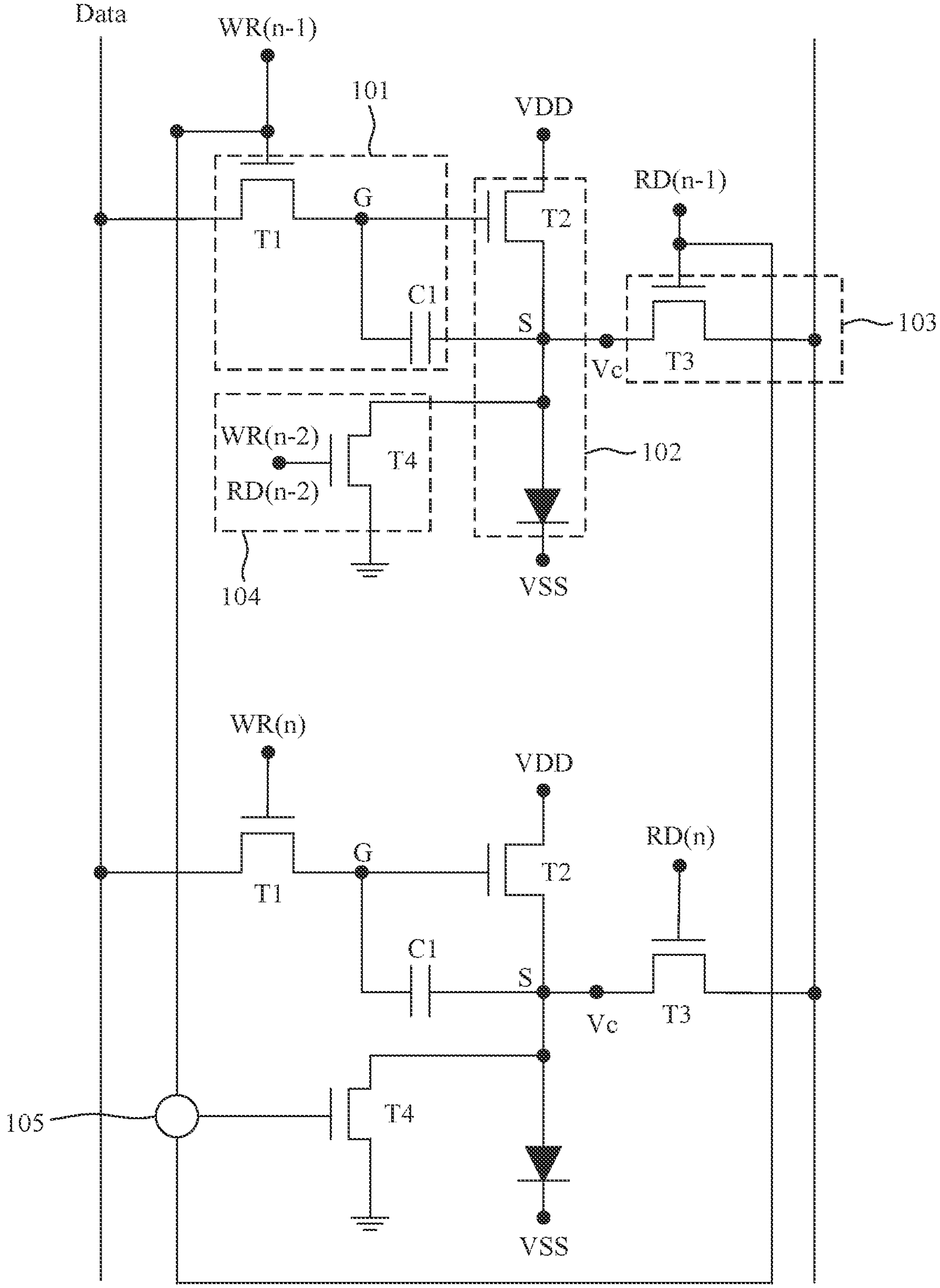
FIG. 4 is a third structural diagram of the pixel driving unit in the pixel driving circuit of the present disclosure.

Please refer to FIG. 4, the first control signal WRn−1 of the (n−1)th stage is the write signal, which is connected to the gate of the first thin film transistor T1 in the switch module 101 to control the switching of the first thin film transistor T1. The second control signal RDn−1 of the (n−1)th stage is the read signal, which is connected to the gate of the third thin film transistor T3 in the detection module 103 to control the switching of the third thin film transistor T3. The reset signal of the (n−1)th stage may come from the first control signal WRn−2 of the (n−2)th stage and the second control signal RDn−2 of the (n−2)th stage. Similarly, the first control signal WRn−1 of the (n−1)th the stage and the second control signal RDn−1 of the (n−1)th stage are connected to the gate of the fourth thin film transistor T4 in the reset module 104 of the nth stage to control the switching of the fourth thin film transistor T4.

In this embodiment, when the first control signal WRn−1 of the (n−1)th stage turns on the first thin film transistor T1 of the current stage, it also turns on the fourth thin film transistor T4 in the reset module 104 of the nth stage at the same time. Alternatively, when the second control signal RDn−1 of the (n−1)th stage turns on the third thin film transistor T3 of the current stage, it also turns on the fourth thin film transistor T4 in the reset module 104 of the nth stage at the same time, that is, when the pixel driving unit in the current stage is working, the reset module 104 of the next stage starts to work, so that the anode terminal of the light-emitting device of the next stage is connected to the ground terminal in the reset module 104, which increases the reset time of the anode terminal of the light-emitting device.

In addition, compared with the embodiments of FIG. 2 and FIG. 3, in the present disclosure, two control signals are connected to the reset module 104, and the input of the first control signal and the second control signal are controlled through the control switch 105. For example, in this embodiment, the first thin film transistor T1 and the third thin film transistor T3 are turned on in stages, instead of being turned on at the same time, that is, the input of the first control signal and the second control signal will be staggered, and the control switch 105 can turn on different paths according to different signals. For example, the control switch 105 may be a bidirectional switch. When the first control signal input is obtained, the control switch 105 connects the first control signal with the fourth thin film transistor T4, and when the second control signal input is obtained, the control switch 105 connects the second control signal with the fourth thin film transistor T4. Alternatively, according to the input period of the first control signal and the second control signal, the channel of the control switch 105 is controlled regularly, such as a path connecting the first control signal and the fourth thin film transistor T4 is opened in a first time period, and a path connecting the first control signal and the fourth thin film transistor T4 is opened in a second time period; finally, the above mentioned two control signals are connected to the reset module 104, the reset time of the anode terminal of the light-emitting device is further increased compared with the foregoing embodiment, and the display uniformity of the product is improved.

In the pixel driving circuit of the present disclosure, the reset signal of the nth stage and the first control signal output terminal that outputs the first control signal of the (n−i)th stage are connected to the first control signal output terminal that outputs the second control signal of the (n−j)th stage.

Figure 5:
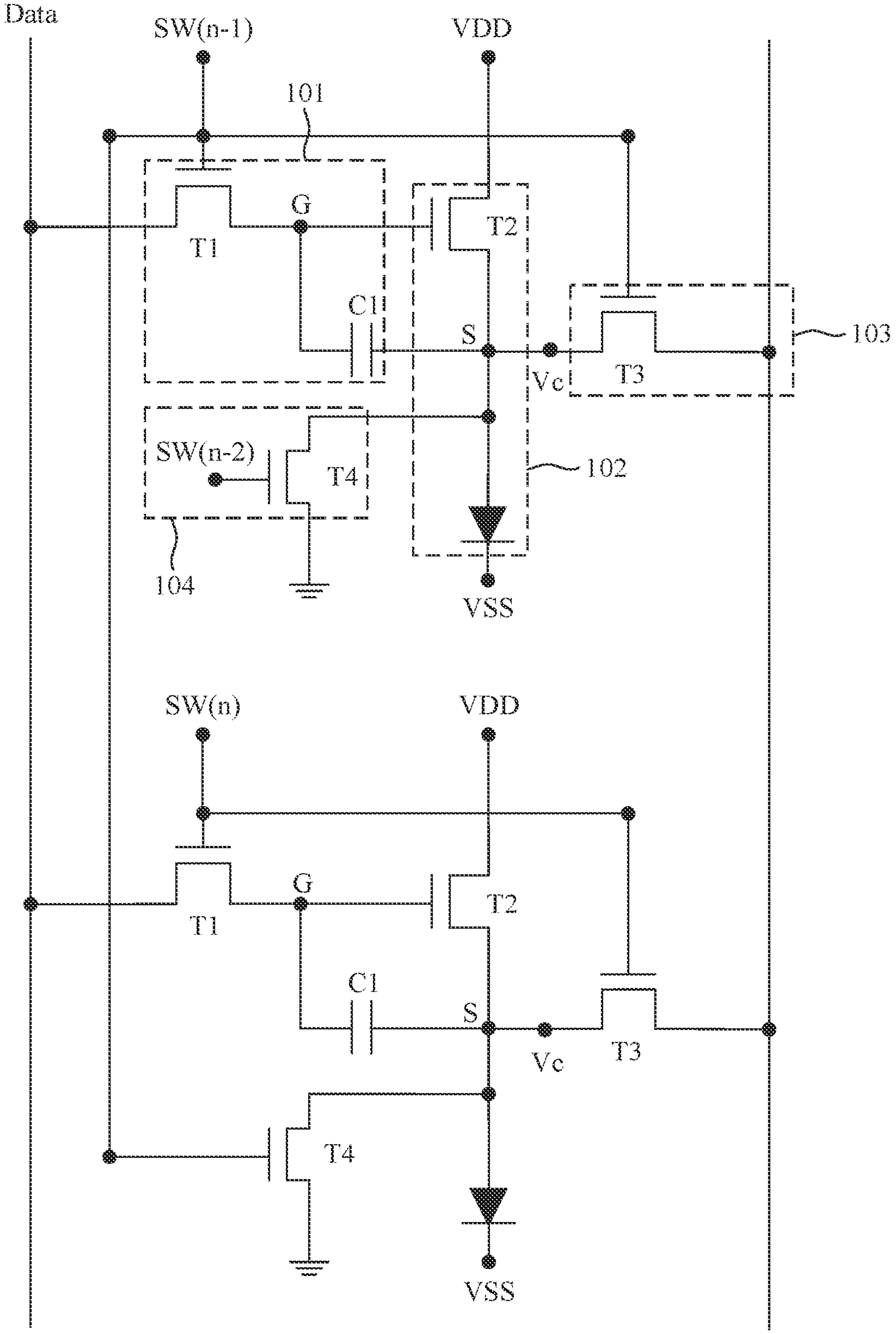
FIG. 5 is a fourth structural diagram of the pixel driving unit in the pixel driving circuit of the present disclosure.

Referring to FIG. 5, the first control signal WRn−1 and the second control signal RDn−1 of the (n−1)th stage are integrated into a shared signal SWn−1, that is, the shared signal SWn−1 of the (n−1)th stage is connected to the gate of the first thin film transistor T1 in the switch module 101 to control the switching of the first thin film transistor T1, and the shared signal SWn−1 of the (n−1)th stage is connected to the gate of the third thin film transistor T3 in the detection module 103 to control the switching of the third thin film transistor T3; and the reset signal of the (n−1)th stage can come from the shared signal SWn−2 of the (n−2)th stage. Similarly, the shared signal SWn−1 of the (n−1)th stage is connected to the gate of the fourth thin film transistor T4 in the reset module 104 of the nth stage to control the switching of the fourth thin film transistor T4.

In this embodiment, when the shared signal SWn−1 of the (n−1)th stage turns on the first thin film transistor T1 and the third thin film transistor T3 of the current stage, the fourth thin film transistor T4 in the reset module 104 of the nth stage is also turned on at the same time. That is, when the pixel driving unit of the current stage is working, the reset module 104 of the next stage starts to work, so that the anode terminal of the light-emitting device of the next stage is connected to the ground terminal in the reset module 104, which increases the reset time of the anode terminal of the light-emitting device. Secondly, three control signals are integrated into a shared signal, and a plurality of thin film transistors are turned on through a shared signal, which simplifies the structure of the pixel drive circuit.

In the pixel driving circuit of the present disclosure, the reset module 104 further comprises a fifth thin film transistor T5, a source of the fifth thin film transistor T5 is electrically connected to the anode terminal of the light-emitting device, and a drain of the fifth thin film transistor T5 is electrically connected to a third constant voltage low level source, and a gate of the fifth thin film transistor T5 is electrically connected to the second control signal output terminal that outputs the second control signal of the (n−j)th stage. The gate of the fourth thin film transistor T4 is electrically connected to the first control signal output terminal that outputs the first control signal of the (n−i)th stage, and the third constant voltage low level source may be a ground terminal.

Figure 6:
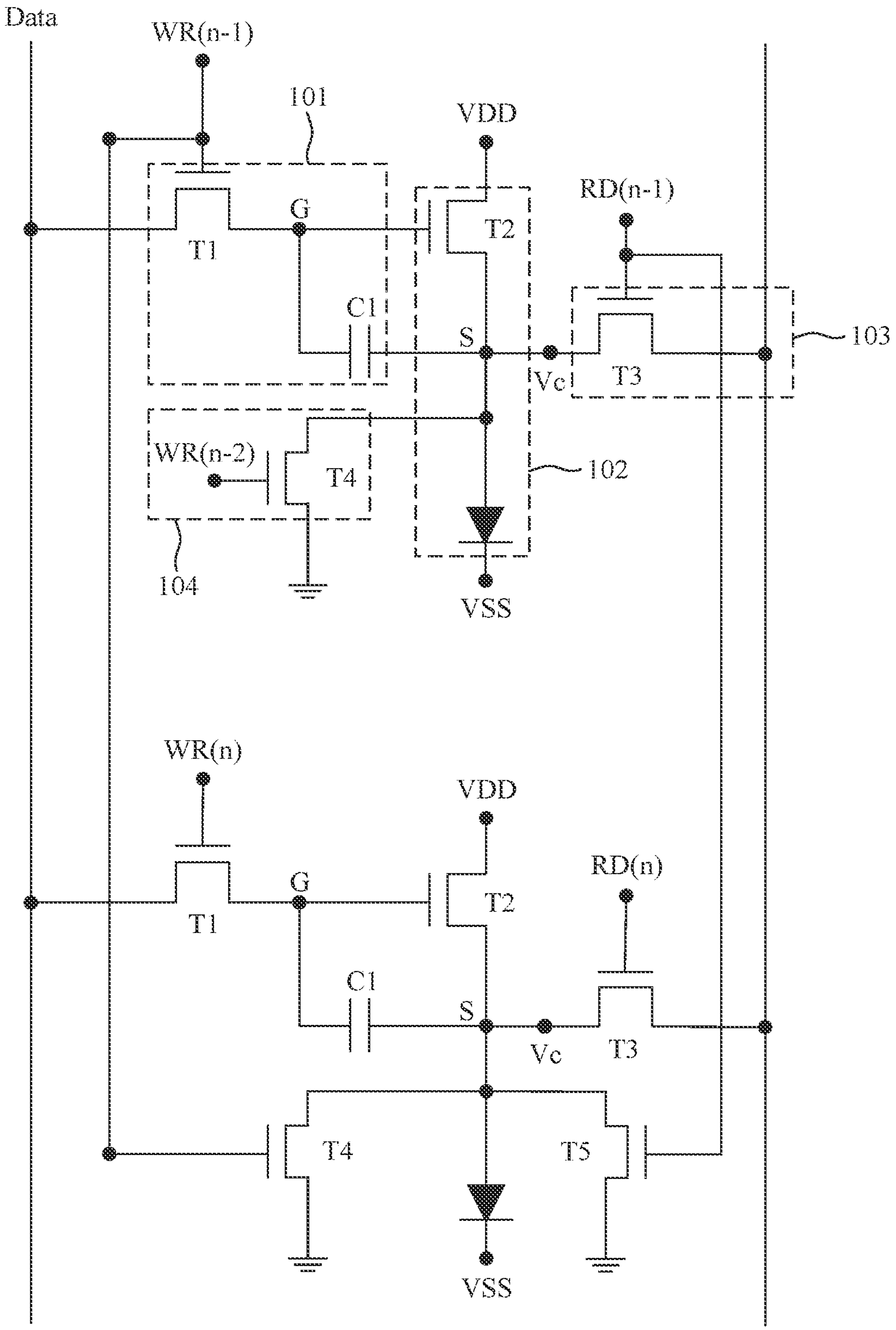
FIG. 6 is a fifth structural diagram of the pixel driving unit in the pixel driving circuit of the present disclosure.
Figure 7:
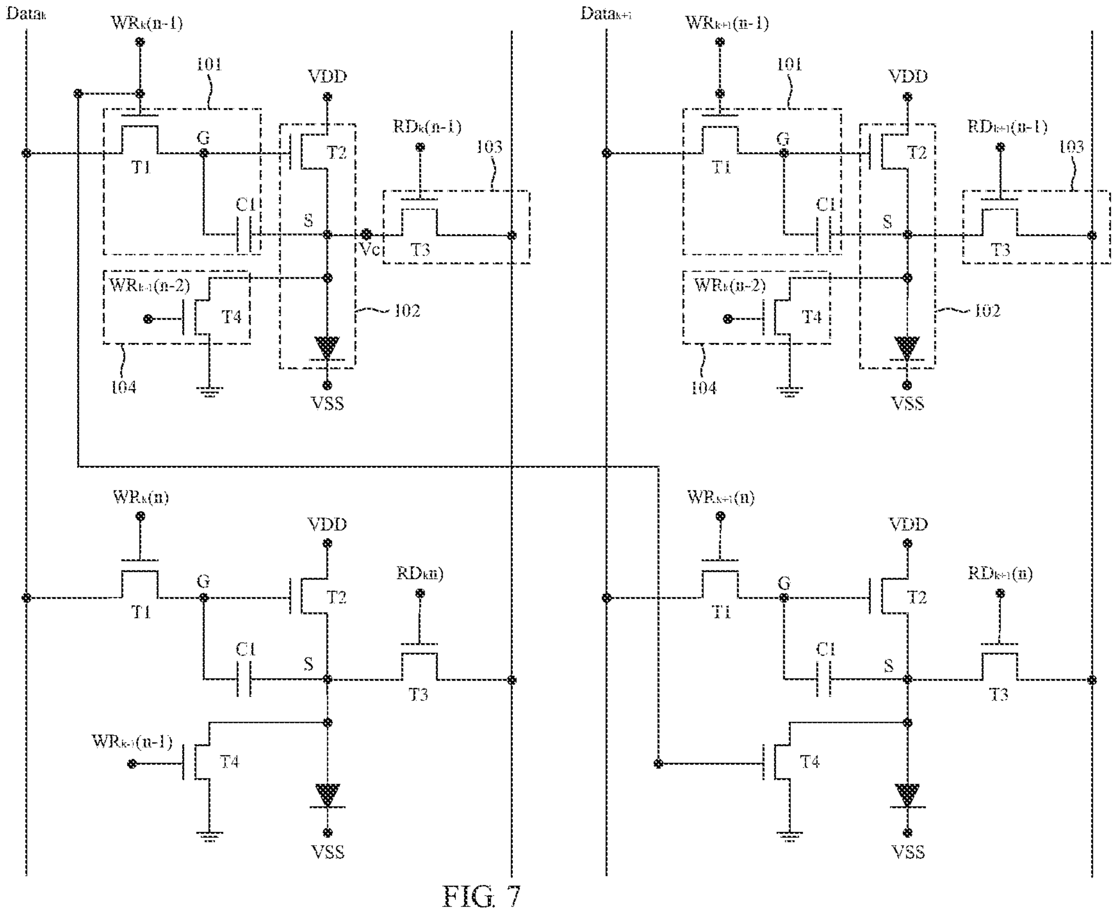
FIG. 7 is a sixth structural diagram of the pixel driving unit in the pixel driving circuit of the present disclosure.

Please refer to FIG. 6, the technical solution of this embodiment is similar to the technical solution of FIG. 4, the difference between the two is that the control switch 105 is provided in the solution of FIG. 4, and the technical solution of FIG. 6 newly adds the fifth thin film transistor T5. The first control signal WRn−1 of the (n−1)th stage is a write signal, which is connected to the gate of the first thin film transistor T1 in the switch module 101 to control the switching of the first thin film transistor T1. The second control signal RDn−1 of the (n−1)th stage is a read signal, which is connected to the gate of the third thin film transistor T3 in the detection module 103 to control the switching of the third thin film transistor T3. The reset signal of the (n−1)th stage may come from the first control signal WRn−2 of the (n−2)th stage and the second control signal RDn−2 of the (n−2)th stage. Similarly, the first control signal WRn−1 of the (n−1)th stage is connected to the gate of the fourth thin film transistor T4 in the reset module 104 of the nth stage to control the switching of the fourth thin film transistor T4. The second control signal RDn−1 of the (n−1)th stage is connected to the gate of the fifth thin film transistor T5 in the reset module 104 of the nth stage to control the switching of the fifth thin film transistor T5.

In this embodiment, when the first control signal WRn−1 of the (n−1)th stage turns on the first thin film transistor T1 of the current stage, it also turns on the fourth thin film transistor T4 in the reset module 104 of the nth stage at the same time. When the second control signal RDn−1 of the (n−1)th stage turns on the third thin film transistor T3 of the current stage, it also turns on the fifth thin film transistor T5 of the reset module 104 of the nth stage at the same time, that is, when the pixel driving unit in the current stage is working, the reset module 104 of the next stage starts to work, so that the anode terminal of the light-emitting device of the next stage is connected to the ground terminal in the reset module 104, which increases the reset time of the anode terminal of the light-emitting device.

In this embodiment, the N pixel driving units may be electrically connected to different data signal lines. Please refer to FIG. 7, which shows a kth data signal line and a (k+1)th data signal line, and the pixel driving unit of the (n−1)th stage and the pixel driving unit of the nth stage electrically connected to the kth data signal line and the (k+1)th data signal line.

In this embodiment, the structure of any pixel driving unit is the same as the structure of the pixel driving unit in FIGS. 1 to 6, and the difference lies in:

The first control signal WRn−1 of the (n−1)th stage is the write signal, which is connected to the gate of the first thin film transistor T1 in the switch module 101 to control the switching of the first thin film transistor T1. The second control signal RDn−1 of the (n−1)th stage is the read signal, which is connected to the gate of the third thin film transistor T3 in the detection module 103 to control the switching of the third thin film transistor T3.

For the pixel driving unit on the kth data signal line, the reset signal of the (n−1)th stage may come from the first control signal $WR_{k-1}$n−2 of the (n−2)th stage on the (k−1)th data signal line. Similarly, the first control signal $WR_k$n−1 of the (n−1)th stage on the kth data signal line and the gate of the fourth thin film transistor T4 in the reset module 104 of the nth stage on the (k+1)th data signal line are connected to control the switching of the fourth thin film transistor T4 in the pixel driving unit of the nth stage on the (k+1)th data signal line.

For the pixel driving unit on the (k+1)th data signal line, the reset signal of the (n−1)th stage may come from the first control signal $WR_k$n−2 of the (n−2)th stage on the kth data signal line. Similarly, the first control signal $WR_{k+1}$(n−1) of the (n−1)th stage on the (k+1)th data signal line and the gate of the fourth thin film transistor T4 in the reset module 104 of the nth stage on the (k+2)th data signal line are connected to control the switching of the fourth thin film transistor T4 in the pixel driving unit of the nth stage on the (k+2)th data signal line.

In this embodiment, when the first control signal $WR_k$n−1 of the (n−1)th stage on the kth data signal line turns on the first thin film transistor T1 of the current stage, the fourth thin film transistor T4 in the reset module 104 of the nth stage the (k+1)th data signal is also turned on at the same time. That is, when the pixel driving unit of the current stage is working, the reset module 104 of the next stage on the adjacent data signal line starts to work, so that the anode terminal of the light-emitting device of the next stage is connected to the ground terminal in the reset module 104, which increases the reset time of the anode terminal of the light-emitting device. In addition, when the first control signal $WR_{k+1}$n−1 of the (n−1)th stage on the (k+1)th data signal line turns on the first thin film transistor T1 of the current stage, it also turns on the fourth thin film transistor T4 in the reset module 104 of the nth stage on the (k+2)th data signal line, that is, when the pixel driving unit in the current stage is working, the reset module 104 of the next stage on the adjacent data signal line starts to work, so that the anode terminal of the light-emitting device of the next stage is connected to the ground terminal in the reset module 104, and the reset time of the anode terminal of the light-emitting device is added.

In this embodiment, the input time of the first control signal and the second control signal can be staggered, that is, similar to the technical solution disclosed in FIG. 4; or the first control signal and the second control signal are input at the same time, and the reset effectiveness of the reset unit is improved.

In this embodiment, due to the existing conventional structure of the detection module 103, related operating principle is not described in detail in the present disclosure.

Figure 8:
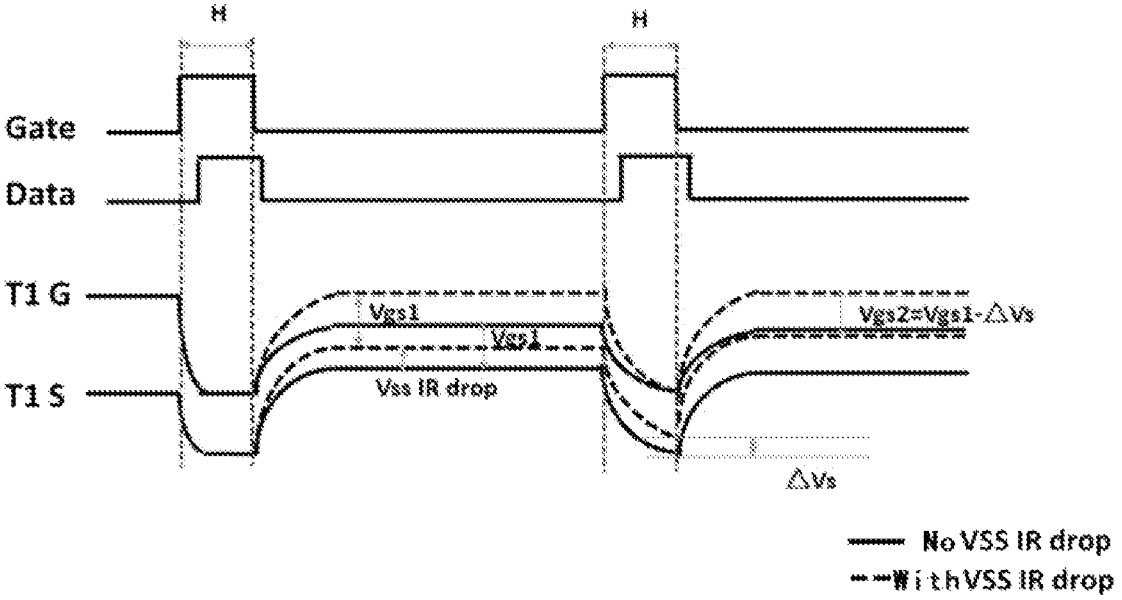
FIG. 8 is a timing comparison diagram of whether there is a voltage drop in an existing pixel driving circuit.

The technical solution of the present disclosure will be described below according to specific embodiments:

In the existing 3T1C circuit, please refer to FIG. 8. When the first constant voltage low level source VSS voltage drop (IR Drop) exists in the panel, since the light-emitting device is turned off during a signal writing stage, the voltage drop of the first constant voltage low level source VSS will not affect a value of the signal writing stage. After the light-emitting device is turned on, the voltage drop of the first constant voltage low level source VSS will be conducted through the light-emitting device to the source of the first thin film transistor T1, and coupled to the second node G of the first thin film transistor T1 under the action of the storage capacitor C1. However, since the brightness of the OLED is mainly affected by a Vgs value of the first thin film transistor T1, when the next frame signal is written, the second node G and the first node S of the first thin film transistor T1 can be reset normally, and the voltage drop of the first constant voltage low level source VSS will have a relatively small impact on the uniformity of the panel. However, it takes a certain time for the potential of the second node G and the first node S of the first thin film transistor T1 to reset. Since the voltage of the first node S is lower and the discharge is slower, the required reset time of the first node S is longer. Therefore, if the reset time is too short, it will not be possible to ensure that the potentials of the second node G and the first node S of the first thin film transistor T1 are reset to the predetermined potential.

However, under high resolution and high refresh conditions, such as a 65-inch 8K resolution display panel, the time allocated to any sub-pixel is further reduced. At this time, the reset time of the first thin film transistor T1 is very limited. When the signal of the next frame is written, the potential of the first node S of the first thin film transistor T1 cannot be completely reset to the voltage written by the third thin film transistor T3, causing the raised potential of the first node S of the first thin film transistor T1 failing to fully recover, which in turn affects the final Vgs, and results in poor uniformity of the AMOLED panel.

Figure 10:
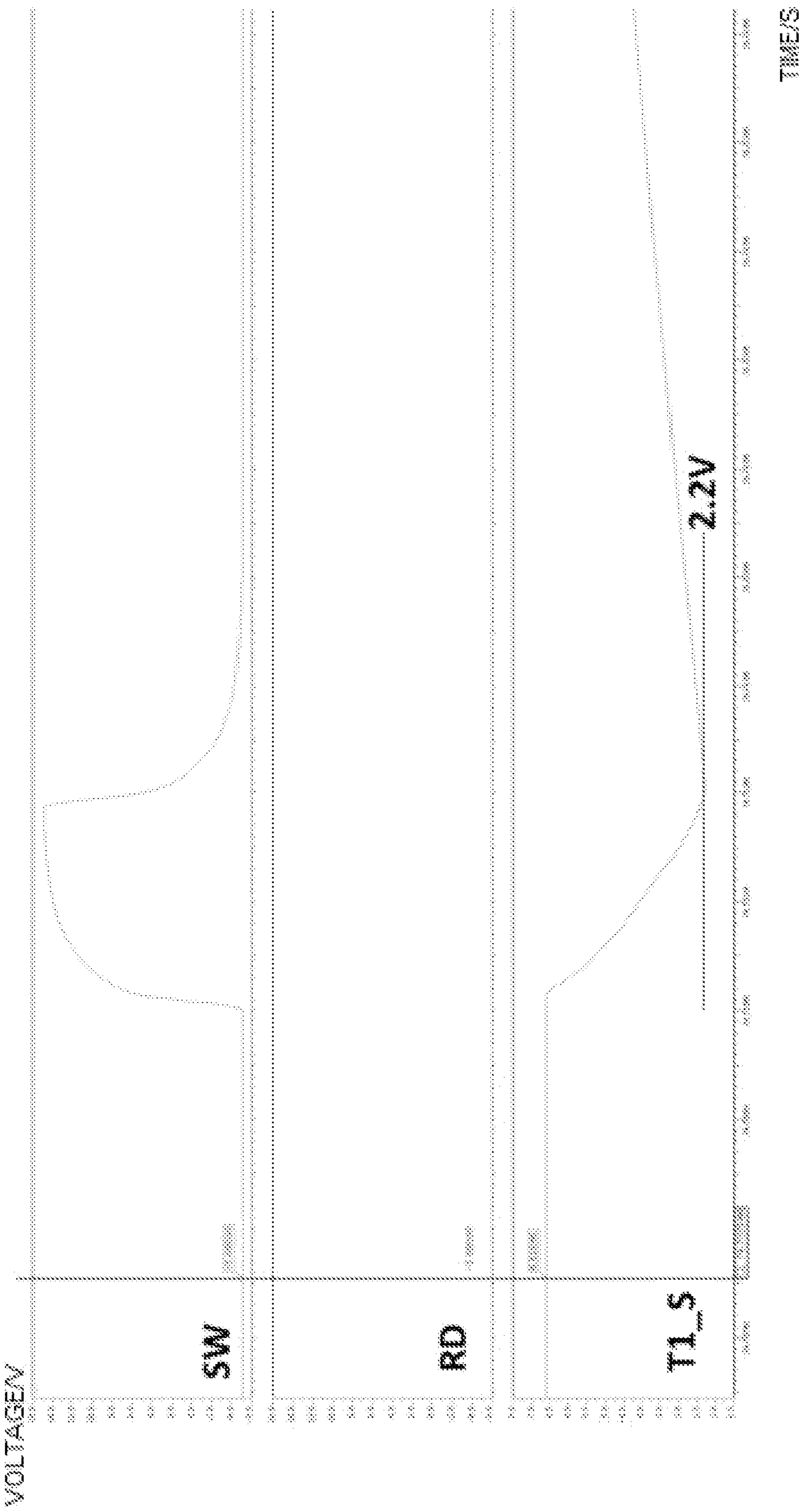
FIG. 10 is a reset result diagram of a first node of a pixel driving unit in the existing pixel driving circuit.

Please refer to FIG. 10, which is a measurement result diagram corresponding to an existing 3T1C circuit. Due to the voltage drop of the first constant voltage low level source VSS, for a large size display panel, the potential of the first node S of the first thin film transistor T1 can only be reset to 2.2V during the reset stage, and the reset target value is 1.2V.

Figure 9:
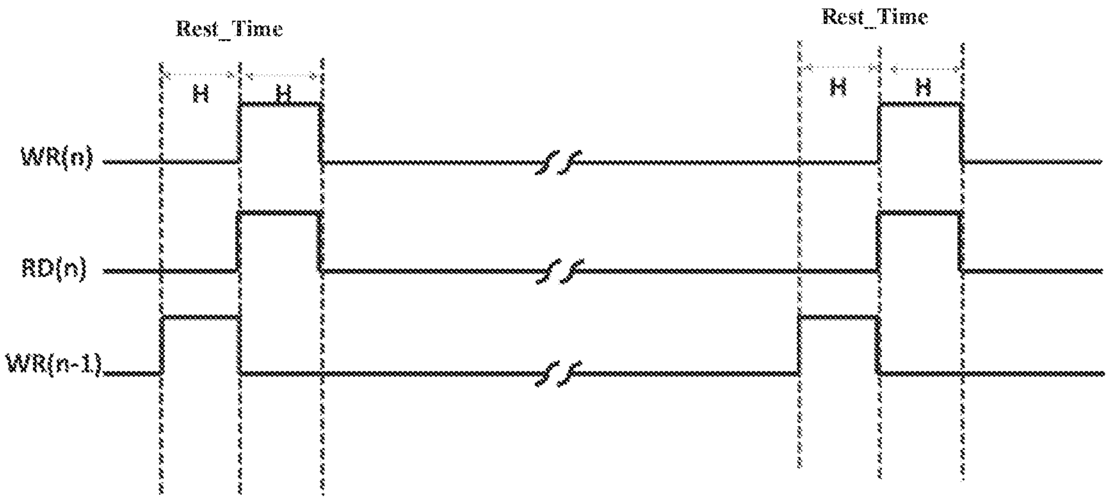
FIG. 9 is a timing structural diagram of the pixel driving circuit of the present disclosure.
Figure 11:
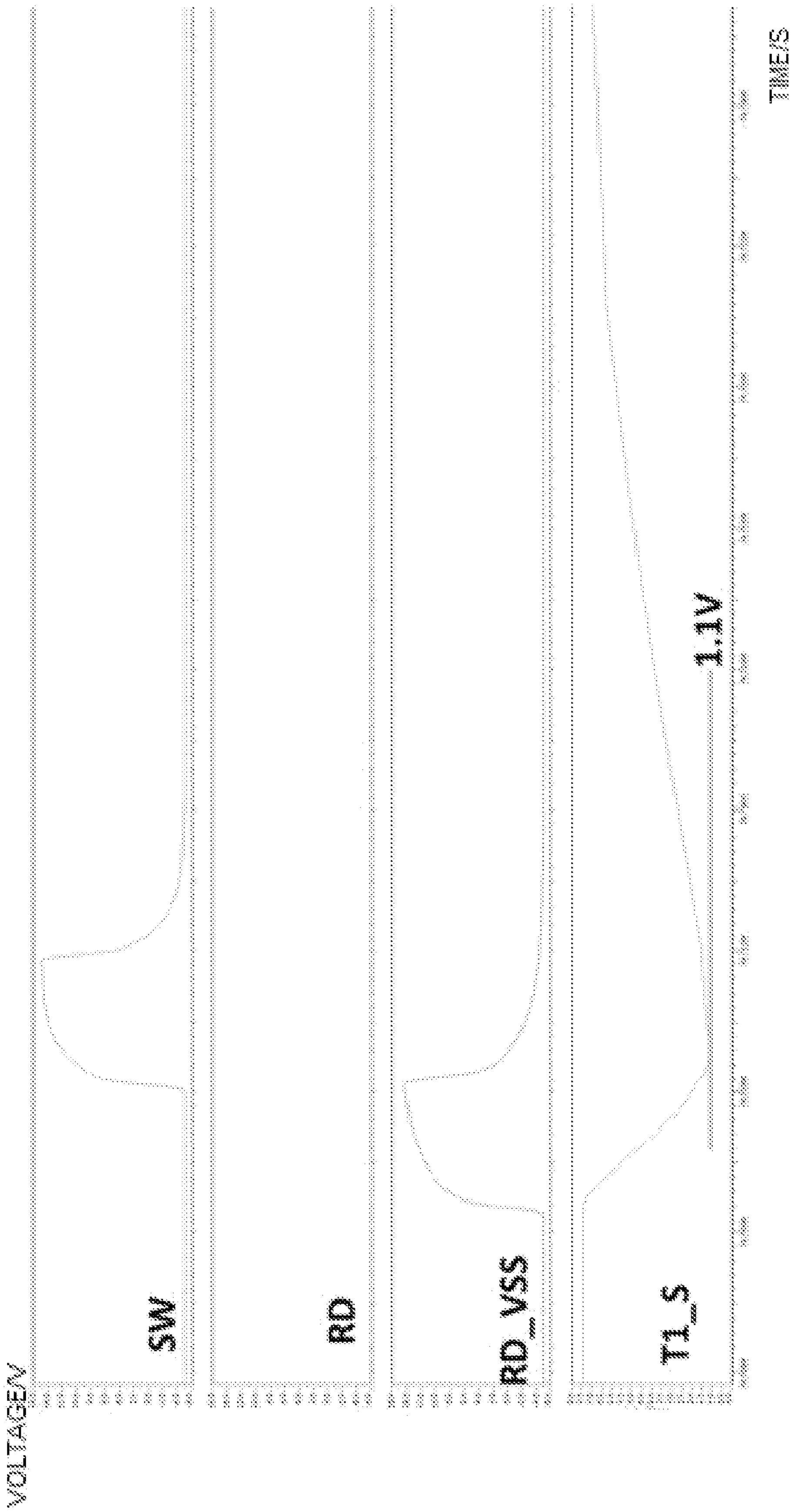
FIG. 11 is a reset result diagram of a first node of the pixel driving unit in the pixel driving circuit of the present disclosure.

Please refer to FIG. 9. FIG. 9 is a timing control diagram corresponding to the foregoing embodiment of the present disclosure. Please refer to FIG. 11. FIG. 11 is an actual measurement result diagram of the structure diagram of FIG. 2 in the present disclosure.

For the pixel driving unit of the (n−1)th stage, when the first control signal WRn−1 is at a high level, and when the first control signal WRn−1 turns on the first thin film transistor T1 of the current stage, the fourth thin film transistor T4 in the reset module 104 of the nth stage is also turned on. That is, when the pixel driving unit of the current stage is working, the reset module 104 of the nth stage starts to work. When the first control signal WRn−1 is at a low level, the first control signal WRn−1 cannot turn on the fourth thin film transistor T4 in the reset module 104 of the nth stage, but at this time, the first control signal WRn of the nth stage turns on the first thin film transistor T1 of the current stage, so that the reset module 104 of the nth stage starts working again. Therefore, compared with the prior art, the working time of the reset module of the present disclosure is changed from the existing H to 2H, which increases the reset time for the reset module to reset the potential of the anode terminal.

Specifically, since the first control signal of the previous stage turns on the reset module of the next stage in advance, when the reset module of the current stage is working, the potential of the first node S of the first thin film transistor T1 has been reset to 1.1. V, and 1.2V will be written to the target point later.

Therefore, the above technical solution advances the operation of the reset module of the current stage through the control signal of the previous stage to reset the potential of the anode terminal of the light-emitting device in the light-emitting module to the threshold potential, which increases a reset time for the reset module 104 to reset the potential of the anode terminal and causes the potential of the anode terminal of the light-emitting device to be pulled up to the threshold potential, therefore improving display uniformity of the display panel.

The disclosure also provides a display panel, wherein the display panel comprises the above-mentioned pixel driving circuit. The working principle of the display panel is the same as or similar to the working principle of the above-mentioned pixel driving circuit, and will not be repeated here.

The present disclosure proposes a pixel driving circuit and a display panel. The pixel driving circuit comprises N pixel driving units connected in cascade. Any one of the pixel driving units comprises the light-emitting module, the switch module connected to the first control signal of the nth stage, the detection module connected to the second control signal of the nth stage, and the reset module connected to the reset signal of the nth stage; the reset signal of the nth stage is connected to the output terminal that outputs the control signal of the mth stage, so that when the light-emitting module of the mth stage is working, the reset module of the nth stage is operated in advance through the control signal of the current stage to reset the potential of the anode terminal of the light-emitting device in the light-emitting module to the threshold potential, which increases a reset time for the reset module 104 to reset the potential of the anode terminal and causes the potential of the anode terminal of the light-emitting device to be pulled up to the threshold potential, therefore improving display uniformity of the display panel.

It can be understood that for those of ordinary skill in the art, equivalent substitutions or changes can be made according to the technical solution and inventive concept of the present disclosure, and all these changes or substitutions should fall within the protection scope of the appended claims of the present disclosure.

What is claimed is:

1. A pixel driving circuit, wherein the pixel driving circuit comprises N pixel driving units cascaded, and a pixel driving unit of an nth stage is any one of the N pixel driving units, and the pixel driving unit of the nth stage comprises:

a light-emitting module comprising a light-emitting device for emitting light;

a switch module connected to the light-emitting module, wherein the switch module is connected to a first control signal of the nth stage and a data signal, and the switch module is configured to transmit the data signal to the light-emitting module under control of the first control signal of the nth stage;

a detection module connected to the light-emitting module, wherein the detection module is connected to a second control signal of the nth stage, and the detection module is configured to detect a monitoring voltage of a first node in the light-emitting module and generate a compensation voltage of the light-emitting module according to a preset voltage; and a reset module connected to the light-emitting module, wherein the reset module is connected to a reset signal of the nth stage, and the reset signal of the nth stage is connected to an output terminal that outputs a control signal of an mth stage prior to the nth stage, and the reset module is configured to reset a potential of the first node to a threshold potential, wherein N, n, and m are positive integers, n and m are both less than or equal to N, wherein at least two of the N pixel driving units are electrically connected to a same data signal line, wherein the switch module comprises a storage capacitor and a first thin film transistor;

wherein a first terminal of the storage capacitor is electrically connected to a second node, and a second terminal of the storage capacitor is electrically connected to the first node; and wherein a gate of the first thin film transistor is electrically connected to the first control signal of the nth stage, a source of the first thin film transistor is electrically connected to the data signal, and a drain of the first thin film transistor is electrically connected to the second node.

2. The pixel driving circuit according to claim 1, wherein the light-emitting module comprises a second thin film transistor and the light-emitting device;

wherein a gate of the second thin film transistor is electrically connected to the second node, a source of the second thin film transistor is electrically connected to a constant voltage high level source, and a drain of the second thin film transistor is electrically connected to the first node; and wherein an anode terminal of the light-emitting device is electrically connected to the first node, and a cathode terminal of the light-emitting device is electrically connected to a first constant voltage low level source.

3. The pixel driving circuit according to claim 2, wherein the detection module comprises a third thin film transistor and a voltage detection module; and wherein a gate of the third thin film transistor is electrically connected to the second control signal of the nth stage, a source of the third thin film transistor is electrically connected to the voltage detection module, and a drain of the third thin film transistor is electrically connected to the first node, and the voltage detection module is configured to detect the monitoring voltage of the light-emitting module, and generate the compensation voltage of the light-emitting module according to comparison between the monitoring voltage and the preset voltage.

4. The pixel driving circuit according to claim 3, wherein the reset module comprises a fourth thin film transistor, a gate of the fourth thin film transistor is electrically connected to a reset signal of the mth stage, a source of the fourth thin film transistor is electrically connected to the anode terminal of the light-emitting device, and a drain of the fourth thin film transistor is electrically connected to a second constant voltage low level source, and the reset module is configured to reset a potential of the anode terminal of the light-emitting device to the threshold potential.

5. The pixel driving circuit according to claim 4, wherein the reset signal of the nth stage is connected to a first control signal output terminal that outputs a first control signal of an (n−i)th stage or a second control signal output terminal that outputs a second control signal of an (n−j)th stage, and the first control signal of the (n−i)th stage is configured to transmit the data signal to the light-emitting module and reset the potential of the anode terminal of the light-emitting device to the threshold potential; and the second control signal of the (n−j)th stage is configured to detect the monitoring voltage of the light-emitting module and reset the potential of the anode terminal of the light-emitting device to the threshold potential; and wherein i and j are positive integers.

6. The pixel driving circuit according to claim 4, wherein the reset signal of the nth stage is connected to a first control signal output terminal that outputs a first control signal of an (n−i)th stage and a second control signal output terminal of a second control signal of an (n−j)th stage, and i and j are positive integers; and wherein the reset module further comprises a control switch electrically connected to the gate of the fourth thin film transistor, and the control switch is configured to transmit the first control signal of the (n−i)th stage or the second control signal of the (n−j)th stage to the gate of the fourth thin film transistor.

7. The pixel driving circuit according to claim 4, wherein the reset signal of the nth stage and a first control signal output terminal for outputting a first control signal of an (n−i)th stage are connected to a second control signal output terminal for outputting a second control signal of an (n−j)th stage, and i and j are positive integers.

8. The pixel driving circuit according to claim 4, wherein the reset module further comprises a fifth thin film transistor, a source of the fifth thin film transistor is electrically connected to the anode terminal of the light-emitting device, and a drain of the fifth thin film transistor is electrically connected to a third constant voltage low level source; and wherein a gate of the fifth thin film transistor is electrically connected to a second control signal output terminal that outputs a second control signal of an (n−j)th stage, and the gate of the fourth thin film transistor is electrically connected to a first control signal output terminal that outputs a first control signal an (n−i)th stage.

9. A display panel, wherein the display panel comprises a pixel driving circuit comprising N pixel driving units cascaded, and a pixel driving unit of an nth stage is any one of the N pixel driving units, and the pixel driving unit of the nth stage comprises:

a light-emitting module comprising a light-emitting device for emitting light;

a switch module connected to the light-emitting module, wherein the switch module is connected to a first control signal of the nth stage and a data signal, and the switch module is configured to transmit the data signal to the light-emitting module under control of the first control signal of the nth stage;

a detection module connected to the light-emitting module, wherein the detection module is connected to a second control signal of the nth stage, and the detection module is configured to detect a monitoring voltage of a first node in the light-emitting module and generate a compensation voltage of the light-emitting module according to a preset voltage; and a reset module connected to the light-emitting module, wherein the reset module is connected to a reset signal of the nth stage, and the reset signal of the nth stage is connected to an output terminal that outputs a control signal of an mth stage prior to the nth stage, and the reset module is configured to reset a potential of the first node to a threshold potential, wherein N, n, and m are positive integers, n and m are both less than or equal to N, wherein at least two of the N pixel driving units are electrically connected to a same data signal line, wherein the switch module comprises a storage capacitor and a first thin film transistor;

wherein a first terminal of the storage capacitor is electrically connected to a second node, and a second terminal of the storage capacitor is electrically connected to the first node; and wherein a gate of the first thin film transistor is electrically connected to the first control signal of the nth stage, a source of the first thin film transistor is electrically connected to the data signal, and a drain of the first thin film transistor is electrically connected to the second node.

10. The display panel according to claim 9, wherein the light-emitting module comprises a second thin film transistor and the light-emitting device;

wherein a gate of the second thin film transistor is electrically connected to the second node, a source of the second thin film transistor is electrically connected to a constant voltage high level source, and a drain of the second thin film transistor is electrically connected to the first node; and wherein an anode terminal of the light-emitting device is electrically connected to the first node, and a cathode terminal of the light-emitting device is electrically connected to a first constant voltage low level source.

11. The display panel according to claim 10, wherein the detection module comprises a third thin film transistor and a voltage detection module; and wherein a gate of the third thin film transistor is electrically connected to the second control signal of the nth stage, a source of the third thin film transistor is electrically connected to the voltage detection module, and a drain of the third thin film transistor is electrically connected to the first node, and the voltage detection module is configured to detect the monitoring voltage of the light-emitting module, and generate the compensation voltage of the light-emitting module according to comparison between the monitoring voltage and the preset voltage.

12. The display panel according to claim 11, wherein the reset module comprises a fourth thin film transistor, a gate of the fourth thin film transistor is electrically connected to a reset signal of the mth stage, a source of the fourth thin film transistor is electrically connected to the anode terminal of the light-emitting device, and a drain of the fourth thin film transistor is electrically connected to a second constant voltage low level source, and the reset module is configured to reset a potential of the anode terminal of the light-emitting device to the threshold potential.

13. The display panel according to claim 12, wherein the reset signal of the nth stage is connected to a first control signal output terminal that outputs a first control signal of an (n−i)th stage or a second control signal output terminal that outputs a second control signal of an (n−j)th stage, and the first control signal of the (n−i)th stage is configured to transmit the data signal to the light-emitting module and reset the potential of the anode terminal of the light-emitting device to the threshold potential; and the second control signal of the (n−j)th stage is configured to detect the monitoring voltage of the light-emitting module and reset the potential of the anode terminal of the light-emitting device to the threshold potential; and wherein i and j are positive integers.

14. The display panel according to claim 12, wherein the reset signal of the nth stage is connected to a first control signal output terminal that outputs a first control signal of an (n−i)th stage and a second control signal output terminal of a second control signal of an (n−j)th stage, and i and j are positive integers; and wherein the reset module further comprises a control switch electrically connected to the gate of the fourth thin film transistor, and the control switch is configured to transmit the first control signal of the (n−i)th stage or the second control signal of the (n−j)th stage to the gate of the fourth thin film transistor.

15. The display panel according to claim 12, wherein the reset signal of the nth stage and a first control signal output terminal for outputting a first control signal of an (n−i)th stage are connected to a second control signal output terminal for outputting a second control signal of an (n−j)th stage, and i and j are positive integers.

16. The display panel according to claim 12, wherein the reset module further comprises a fifth thin film transistor, a source of the fifth thin film transistor is electrically connected to the anode terminal of the light-emitting device, and a drain of the fifth thin film transistor is electrically connected to a third constant voltage low level source; and wherein a gate of the fifth thin film transistor is electrically connected to a second control signal output terminal that outputs a second control signal of an (n−j)th stage, and the gate of the fourth thin film transistor is electrically connected to a first control signal output terminal that outputs a first control signal an (n−i)th stage.

* * * * *